(12) United States Patent
Kurimoto et al.

(10) Patent No.: US 7,357,411 B2
(45) Date of Patent: Apr. 15, 2008

(54) AIRBAG APPARATUS

(75) Inventors: Takeshi Kurimoto, Echi-gun (JP);
Akifumi Takedomi, Higashiomi (JP);
Kenji Hiraoka, Hiroshima (JP)

(73) Assignee: Takata Corporation, Tokyo (JP)

( * ) Notice: Subject to any disclaimer, the term of this patent is extended or adjusted under 35 U.S.C. 154(b) by 231 days.

(21) Appl. No.: 11/264,101

(22) Filed: Nov. 2, 2005

(65) Prior Publication Data

US 2006/0103120 A1 May 18, 2006

(30) Foreign Application Priority Data

Nov. 16, 2004 (JP) .............................. 2004-331954

(51) Int. Cl.
*B60R 21/26* (2006.01)
(52) U.S. Cl. ................... 280/729; 280/730.2; 280/740
(58) Field of Classification Search ............. 280/730.2, 280/729, 740, 730.1, 736, 739, 742
See application file for complete search history.

(56) References Cited

U.S. PATENT DOCUMENTS

| | | | |
|---|---|---|---|
| 5,586,782 A * | 12/1996 | Zimmerman et al. .... | 280/730.2 |
| 5,803,485 A | 9/1998 | Acker et al. | |
| 5,848,804 A | 12/1998 | White et al. | |
| 6,062,594 A | 5/2000 | Asano et al. | |
| 6,142,507 A | 11/2000 | Okuda et al. | |
| 6,349,964 B1 | 2/2002 | Acker et al. | |
| 7,021,652 B2 | 4/2006 | Kumagai et al. | |
| 2003/0160433 A1 | 8/2003 | Kumagai et al. | |
| 2004/0130127 A1* | 7/2004 | Kurimoto et al. ............ | 280/729 |
| 2004/0183285 A1* | 9/2004 | Nishikaji et al. ......... | 280/730.2 |
| 2004/0188989 A1* | 9/2004 | Kanto et al. .............. | 280/730.2 |
| 2005/0006883 A1* | 1/2005 | Sato et al. ................. | 280/730.2 |
| 2006/0001244 A1* | 1/2006 | Taguchi et al. ............. | 280/729 |
| 2006/0022441 A1* | 2/2006 | Hayashi et al. .......... | 280/730.2 |
| 2006/0103119 A1* | 5/2006 | Kurimoto et al. ......... | 280/730.2 |
| 2006/0103120 A1* | 5/2006 | Kurimoto et al. ......... | 280/730.2 |
| 2006/0131845 A1* | 6/2006 | Belwafa et al. ............. | 280/729 |
| 2006/0131847 A1* | 6/2006 | Sato et al. ................. | 280/730.2 |
| 2006/0267318 A1* | 11/2006 | Nishikaji et al. ......... | 280/730.2 |

FOREIGN PATENT DOCUMENTS

| | | |
|---|---|---|
| DE | 19930157 | 1/2001 |
| EP | 1433667 | 6/2004 |
| GB | 2402912 | 12/2004 |
| JP | 09220993 | 8/1997 |
| JP | 10175497 | 6/1998 |
| JP | 10175499 | 6/1998 |
| JP | 10217896 | 8/1998 |
| JP | 2004210047 | 7/2004 |
| WO | WO 98/12077 | 3/1998 |
| WO | WO 9856622 | 12/1998 |

* cited by examiner

*Primary Examiner*—Paul N. Dickson
*Assistant Examiner*—Karen J. Amores
(74) *Attorney, Agent, or Firm*—Manabu Kanesaka

(57) ABSTRACT

An airbag apparatus includes an airbag to be deployed and inflated in a passenger protection area between a vehicle passenger and a vehicle side wall portion in case of vehicle accident. The airbag has a head chamber for protecting a head of a vehicle passenger and a chest chamber for protecting a chest portion of the passenger. A gas supply device is provided for simultaneously supplying gas to the head chamber and the chest chamber. A pressure adjusting device adjusts an internal pressure of the head chamber to a level higher than an internal pressure of the chest chamber at the time of deployment and inflation of the airbag.

9 Claims, 4 Drawing Sheets

UPPER SIDE OF VEHICLE

FRONT OF VEHICLE

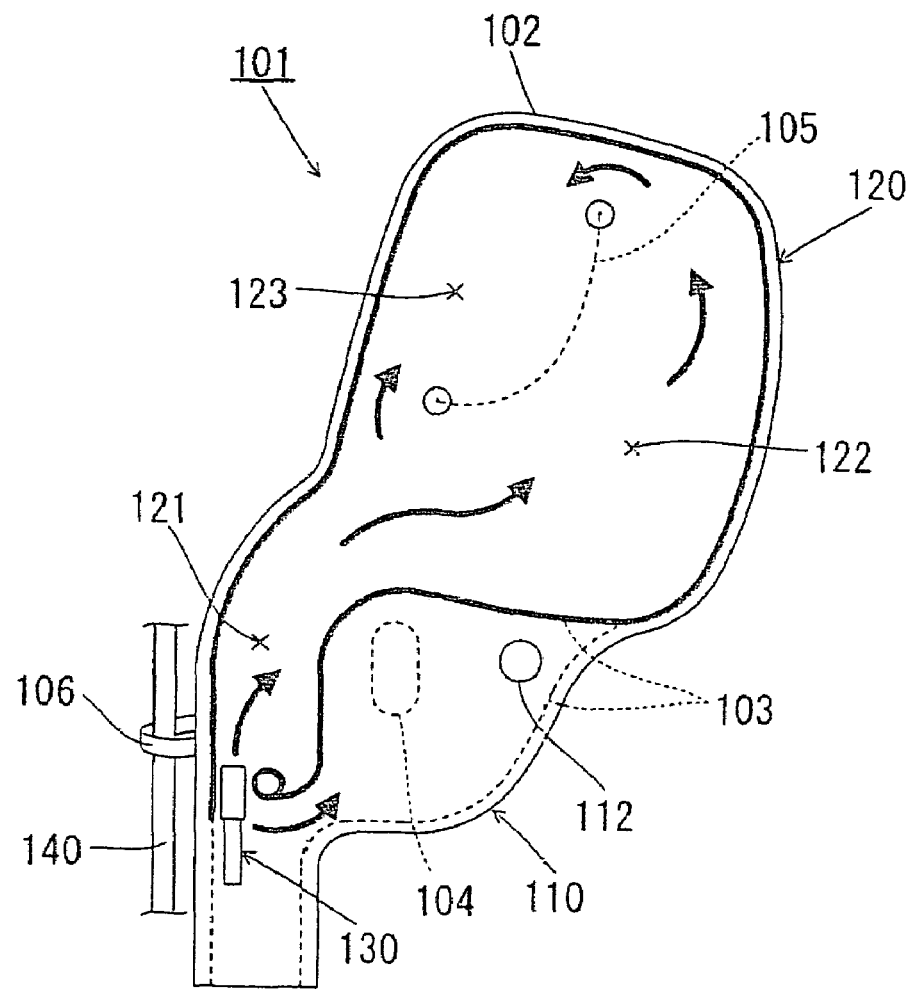
Fig. 1
UPPER SIDE OF VEHICLE
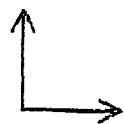
FRONT OF VEHICLE

AIRBAG APPARATUS

BACKGROUND OF THE INVENTION AND RELATED ART STATEMENT

The present invention relates to an airbag apparatus for a vehicle such as an automotive vehicle and more specifically to an airbag apparatus which is deployed and inflated in a passenger protection zone between a vehicle passenger and a vehicle side wall potion for protecting the head and chest regions of the vehicle passenger in case of vehicle accident such as side collision or sideward rollover of the vehicle.

Various types of airbag apparatus have been proposed for protecting the head and chest portions of a vehicle passenger from impact against or being impacted by a vehicle side wall portion such as a side window or a door in case of vehicle accident such as side collision or rollover of a vehicle. For example, Japanese Unexamined Patent Publication No. 10-297409 discloses an airbag apparatus provided with two internal spaces, that is, a lower space or chamber for protecting the chest/upper body of the vehicle passenger and an upper chamber which is communicated with the lower chamber for protecting the head of the vehicle passenger. The airbag apparatus disclosed in this Japanese Unexamined Patent Publication is configured in such a manner that the airbag is deployed and inflated entirely by supplying gas from an inflator upon occurrence of vehicle accident first to the lower chamber, and after flowing into the lower chamber, the gas is then supplied into the upper chamber.

In the airbag apparatus of this type intended for protecting the head portion and the chest portion of the vehicle passenger in case of vehicle accident, it is highly desirable to ensure protection of the vehicle passenger by deploying and inflating the airbag in an optimal manner corresponding to the respective portions of the vehicle passenger which require protection.

In view of this, it is an object of the present invention to provide an airbag apparatus development technique and arrangement which can ensure protection of the head portion and the chest portion of the vehicle passenger in case of vehicle accident.

Further objects and advantages of the invention will be apparent from the following description of the invention.

SUMMARY OF THE INVENTION

The present invention is intended to solve the above described problems and provide an airbag apparatus in a manner which provides effective protection for at least the head and chest portions of the vehicle passenger, and which can be applied to various types of vehicle, more typically automotive vehicles.

A first aspect of the present invention resides in an airbag arrangement which has at least an airbag, gas supply means, and a pressure adjusting arrangement. The airbag is configured to be deployed and inflated in a passenger protecting zone between a vehicle passenger and a vehicle side wall portion in case of a vehicle accident such as a side collision or a vehicle rollover.

Gas for deployment and inflation is supplied to the airbag via a gas supply device having a gas generating function. The term "vehicle side wall portion" in this specification widely includes a vehicle structure disposed like a wall surface on the (right or left) side of the vehicle passenger, and typically, the vehicle side wall portion is constituted by a side window, pillar door trim or the like.

In particular, the airbag of the present invention includes at least a head chamber for protecting a head of the vehicle passenger, and a chest chamber for protecting the chest/upper torso region of the vehicle passenger. At least the head chamber is formed into fluidly interconnected compartments defined by partitioning the internal space of the airbag. The present invention includes a structure in which chambers in addition to the head chamber and the chest chamber are formed in the airbag.

The gas supply device used in exemplary embodiments of the present invention is configured for deployment and inflation by supplying gas in parallel to the head chamber and the chest chamber of the airbag. The term "supply in parallel" refers to a mode in which the gas for deployment and inflation is supplied to the head chamber and the chest chamber simultaneously via a plurality of separate (parallel) gas supply paths.

The pressure adjusting arrangement/means used in exemplary embodiments of the present invention is configured to adjust the internal pressure of the head chamber to a level which is higher than the internal pressure of the chest chamber at the time of deployment. Therefore, by using the pressure adjusting arrangement/means, the internal pressure of the head chamber is higher than the internal pressure of the chest chamber at the time of airbag deployment and inflation. The term "deployment and inflation" in this disclosure is intended to encompass the timing from a beginning of deployment and inflation process to completion of inflation.

In this arrangement, the head portion of the vehicle passenger is protected by the head chamber the internal pressure of which is relatively higher among the respective portions of the airbag at the time of deployment and inflation. The chest portion of the vehicle passenger is protected by the chest chamber the internal pressure of which is relatively lower at the time of deployment and inflation. Accordingly, the airbag can be deployed and inflated in an optimal manner corresponding to the respective portions of the vehicle passenger to be protected, whereby protection of the vehicle passenger can be ensured.

The structure of the pressure adjusting arrangement/means of the exemplary embodiments of present invention may employ various modes as needed. For example, the pressure adjusting means in the present invention may be configured by 1) employing a structure in which gas of uniform pressure supplied from a single structure gas supply device/means is distributed and supplied in parallel to the head chamber and the chest chamber while adjusting the quantity of gas flow, 2) a structure in which two different types of gas having different pressures supplied from a plurality of structures of gas supply means are distributed and supplied in parallel to the head chamber and the chest chamber respectively, and 3) a structure in which the quantity of gas flow discharged from the interiors of the respective chambers to the outside of the chambers is adjusted using a vent hole or the like.

In other words, the internal pressures of the respective chambers may be fixed based on the quantity of gas retained in the chambers according to a balance between gas flowing into the chambers and gas discharged from the chambers.

A second aspect of the present invention resides in an airbag wherein the pressure adjusting arrangement/means includes at least a gas distributing arrangement/means. The gas distributing arrangement according to this embodiment of the invention, is configured to distribute gas of a uniform pressure supplied from the single structure gas supply means in parallel to the head chamber and the chest chamber while adjusting the quantity of gas flow. By setting the quantity of gas flow to be supplied to the head chamber and the chest chamber as needed using the distribution means, the internal pressure of the head chamber can be adjusted to a higher level than the internal pressure of the chest chamber at the time of deployment and inflation of the airbag. Typically, by adjusting the quantity of gas flow flowing into the head chamber to be larger than that flowing into the chest chamber by the distribution means, the internal pressure of the head chamber becomes higher than the internal pressure of the chest chamber at the time of deployment and inflation of the airbag.

In this arrangement, by using the gas distribution arrangement/means which distributes and supply the gas of a uniform pressure supplied from the gas supply device/means in parallel to the head chamber and the chest chamber while adjusting the quantity of gas flow, the gas supply device can be formed into a single structure and hence the structure is simplified.

A third aspect of the present invention resides in an airbag arrangement wherein the pressure adjusting arrangement/means includes a vent hole. In accordance with this third aspect, the vent hole is formed in an airbag panel for allowing gas in the chest chamber to be discharged out of the chamber. The gas flowing into the chest chamber at the time of deployment and inflation of the airbag is discharged through this vent hole, whereby the vent hole can prevent the internal pressure in the chest chamber from excessively increasing or the high-pressure state in the chest chamber from being maintained for a prolonged period.

In this arrangement, the internal pressures of the chambers can be adjusted reliably by the use of the vent hole so that the internal pressure of the head chamber becomes higher than the internal pressure of the chest chamber at the time of deployment and inflation. In particular, by configuring the pressure adjusting arrangement/means using both of the vent hole and the gas distribution arrangement mentioned above, adjustment of the internal pressure of the chamber can be achieved reliably and quickly.

A fourth aspect of the invention resides in an airbag apparatus which is configured in such a manner that a gas sealing agent is applied to the inner wall surface of the airbag panel in order to restrict the release of gas in the head chamber. Air-tightness of the head chamber is enhanced by the gas sealing agent, so that the high-pressure state of the head chamber after deployment and inflation can be prolonged. A typical application mode of the "gas sealing agent" in this specification includes a first arrangement in which a coating layer is formed entirely on the inner wall surfaces of the airbag panels, a second arrangement in which the sealing agent is applied along the seam in which the airbag panels are stitched together, and a third arrangement in which the first arrangement and the second arrangement are combined, with regard to the head chamber. Transmission of gas through the airbag panels themselves is prevented by the first arrangement, and transmission of gas through the seam between the airbag panels is prevented by the second arrangement, and in particular, the both of the transmission of gas through the airbag panels themselves and the transmission of gas through the seam are prevented by the third arrangement, whereby improvement of air-tightness is achieved with higher effectiveness by the cooperation of these arrangements.

In this instance, the gas in the head chamber is restricted from flowing out from the chamber by the gas sealing agent. This increases the internal pressure of the head chamber at the time of deployment and inflation.

A fifth aspect of the invention resides in an airbag apparatus having an airbag wherein a plurality of space areas or compartments are provided and which require different periods to increase to their respective predetermined high (or maximum) pressures. In other words, the airbag is configured to be provided with a plurality of space areas (compartments) which have different pressure build-up characteristics and inflate at different rates.

In this arrangement, by partitioning the head chamber into a plurality of space areas or compartments having different pressure build-up characteristics, the head chamber can be deployed and inflated in accordance with a preferred mode, and hence protection of, particularly, the head of the vehicle passenger can be ensured.

As described above, according to the various aspects of the present invention, with the configuration such that the internal pressure in the head chamber of the deployed and inflated airbag is adjusted to be higher than the internal pressure of the chest chamber, the airbag can be deployed and inflated in an optimal manner corresponding to the respective portion of the passenger which required protection, whereby the protection of the vehicle passenger in case of a vehicle accident is promoted.

BRIEF DESCRIPTION OF THE DRAWINGS

FIG. 1 is a side view showing a structure of a deployed airbag apparatus according to the present embodiment.

DETAILED DESCRIPTION OF PREFERRED EMBODIMENTS

Figure 2:
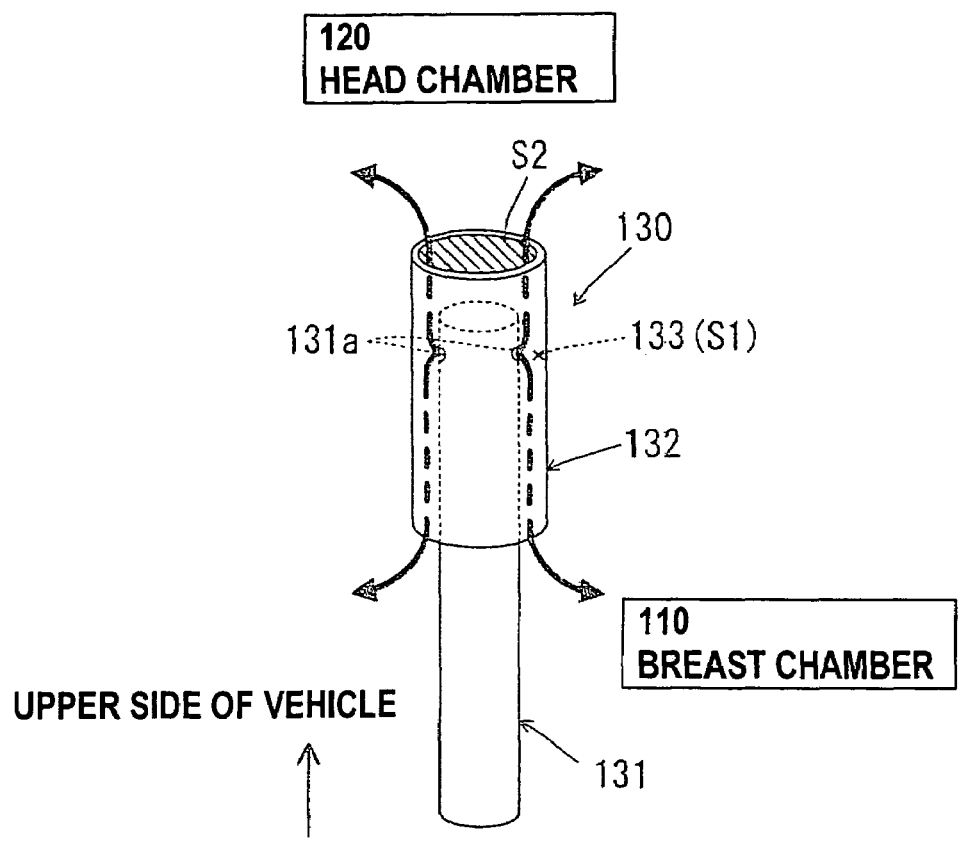
FIG. 2 is an enlarged perspective view showing a gas supply device used in the arrangement depicted in FIG. 1.

Referring now to FIG. 1 to FIG. 4, an airbag apparatus 101 according to an exemplary embodiment of the present invention will be described. The airbag apparatus 101 of the present embodiment is disposed with respect to a vehicle passenger seated on a driver's seat in an automotive vehicle wherein the steering wheel is located on the right hand side of the vehicle.

FIG. 1 is a drawing showing a structure of an airbag apparatus 101 according to the present embodiment, wherein the airbag 102 is fully deployed. As shown in FIG. 1, the airbag apparatus 101 is composed essentially of an airbag 102 and a gas supply device 130. In the present embodiment, the airbag apparatus 101 is disposed in a side portion of a passenger seat (driver's seat S in FIG. 3). In FIG. 1, the airbag 102 is arranged so that the right side (as seen in the drawing) is directed toward the front of the vehicle and the upper side (as seen in the drawing) is directed upwardly with respect to the vehicle.

The airbag 102 includes a chest chamber 110 disposed on the lower side of the vehicle so as to protect a chest and upper torso portion of the vehicle passenger, and a head chamber 120 disposed on the upper side of the vehicle so as to protect the head of the vehicle passenger.

The chest chamber 110 and the head chamber 120 are partitioned from each other by stitching wall surfaces of opposing airbag panels directly together to form seams 103. In the present embodiment, the capacity of the head chamber 120 is larger than that of the chest chamber 110.

The thick solid line shown in the drawing, depicts portions of the seams 103 wherein a gas sealing agent is applied. This sealing agent can be for example, a silicon based sealing agent which functions to prevent transfer of gas between an interior and an exterior of the head chamber 120 and enhance the air-tightness of the head chamber 120.

A coating layer is formed at least on the inner wall surface of the head chamber 120 among the respective chambers, and the coating layer functions to prevent escape of gas from the interior of the head chamber 120 and enhance its gas air-tightness.

In this manner, in the head chamber 120 of the present embodiment, since transmission of gas through the seams 103 between the airbag panels is prevented by the gas sealing agent, and the transmission of gas through the airbag panels themselves is prevented by the coating layer, the net effect provides improvement in air-tightness and attendant higher effectiveness.

The airbag 102 is stored in the airbag apparatus 101 built into a side portion of the seat in a folded state (such as in an accordion-like folded state).

In the chest chamber 110, stitching is carried to form a seam 104 which is configured so that the thickness of the chamber in the lateral direction of the vehicle at the time of deployment and inflation becomes the desired thickness (a chamber thickness d1 described later). In other words, in the chest chamber 110, the thickness of the chamber in the lateral direction at the time of deployment and inflation is adjusted by the manner in which the wall surfaces of the opposing airbag panels are directly stitched together by the seam 104.

The lateral direction of the chest chamber 110 corresponds to a normal vector direction of a passenger protection surface of the chest chamber 110 which faces the chest portion of the vehicle passenger in the deployed and inflated state.

The airbag panel of the chest chamber 110 is formed with a vent hole 112 which allows gas to discharge from the chest chamber 110. The diameter (size) of the vent hole 112 is set as needed based on the desired deployment and inflation characteristics of the chest chamber (determined by parameters such the period of gas retention or the gas pressure).

The head chamber 120 is provided with a first compartment 121, a second compartment 122, a third compartment 123 which are arranged to be sequentially inflated.

The first compartment 121 constitutes a gas flow path area for introducing gas into the head chamber 120. The first compartment 121 is disposed below the second compartment 122 and the third compartment 123 at the time of deployment and inflation, and is also formed into a substantially cylindrical-shape member which extends longitudinally in the vertical direction.

The first compartment 121 in this structure functions to support the second compartment 122 and the third compartment 123 firmly from below, thereby ensuring the upright posture of the entire head chamber 120 at the time of deployment and inflation.

The second compartment 122 and the third compartment 123 are deployed and inflated by gas introduced through the first chamber 121, and constitute a protection area for protecting the head of the vehicle passenger/occupant. The second compartment 122 and the third compartment 123 constitute a portion for providing the substantial protective function for the head of the vehicle passenger immediately after the occurrence of an accident.

There may be a case where either one of the second compartment 122 or the third compartment 123 provides the substantial protective function for the head or a case where both of the second compartment 122 and the third compartment 123 achieve the substantial protective function for the head portion depending on the seated position of the vehicle passenger or the state of collision (oblique collision or the like). The second compartment 122 constitutes a space area lager than the third compartment 123 in terms of capacity, and the second compartment 122 is adapted to be increased in pressure earlier than in the third compartment 123 since gas for deployment and inflation passed through the first compartment 121 flows directly into the second compartment 122.

In other words, the period required for increasing the internal pressure to a predetermined high pressure is shorter for the second compartment 122 than for the third compartment 123, and hence a build-up capability is enhanced in the second compartment 122. The second compartment 122 and the third compartment 123 correspond to a "plurality of space areas requiring different periods to increase internal pressure to a predetermined high pressure". The second compartment 122 and the third compartment 123 are partitioned from each other by stitching the airbag panels at a portion corresponding to the head camber 120 at the seam 105. The head chamber 120 is adapted in such a manner that the chamber thickness in the lateral direction at a portion corresponding to the second compartment 122 and the third compartment 123 at the time of deployment and inflation, becomes a desired thickness (chamber thickness d2 described later). The lateral direction of the head chamber 120 corresponds to a normal vector direction of a passenger protections surface of the head chamber 120 which faces the head portion of the vehicle passenger in the deployed and inflated state.

A strap 106 which functions as a connecting band is connected to the airbag 102 having the structure described above. This strap 106 encircles a supporting rod 140 which extends in the vertical direction of the vehicle. Accordingly, the airbag 102 and the supporting rod 140 are connected via the strap 106. The supporting rod 140 allows movement of the airbag 102 in the vertical direction via the strap 106 and functions as a guide member which guides the airbag 102 upward at the time of deployment and inflation. The supporting rod 140 is fixed to a frame portion of a vehicle seat or a bolt portion of a retainer.

The gas supply device 130 has a structure which can generate gas for deployment and inflation and supply the gas to the inner space of the airbag 102. The gas supply device 130 is arranged in the airbag 102 longitudinally in the vertical direction near an inlet arrangement which communicates with both the head chamber 120 and the chest chamber 110.

A perspective view of the structure of the gas supply device 130 is shown in FIG. 2. As shown in this figure, the gas supply device 130 includes a single inflator 131 and a flow directing cylindrical sleeve 132. The sleeve 132 is arranged so as to cover a gas discharge portion 131a of the inflator 131. Accordingly, an inner peripheral portion of the sleeve 132 and an outer peripheral portion of the inflator 131 form a space 133 therebetween which extends in the vertical direction.

In this arrangement, gas of a uniform pressure is discharged sideward from the gas discharge portion (discharge holes) 131a and is distributed in parallel both toward the head chamber 120 on the upper side, and the chest chamber 110 on the lower side. The gas discharged from the gas discharge portion 131a impinges against the inner peripheral surface of the sleeve 132, then partly flows upward in the space 133, and into the head chamber 120 side.

On the other hand, the remaining gas flows downward in the space 133 and flows into the chest chamber 110 side. At this time, the sleeve 132 prevents generation of uneven gas flow by being affected by the deployment conditions of the airbag 102 (the folded state of the airbag, the mode of deployment of the cover, and so on), by forming a space 133 for allowing smooth gas flow between the sleeve 132 and the outer periphery of the inflator 131, thereby functioning to smooth the supply of gas to the respective chambers.

In the present embodiment, a cross sectional area S2 of a flow path through which the gas flows toward the head chamber 120 side may be formed to be larger than a cross sectional area (a cross sectional area S1 of the space 133) of a flow path through which gas flows toward the chest chamber 110. Accordingly, the resistance of the flow path of the gas directed to the head chamber 120 can be reduced, whereby the quantity of gas flow flowing into the head chamber 120 becomes larger than the quantity of gas flow flowing into the chest chamber 110.

In this manner, the gas supply device 130 of the present embodiment constitutes a device for supplying gas for deployment and inflation in parallel to the chest chamber 110 and the head chamber 120, and therefore constitutes the "gas supply device/means" which is utilized in one or more embodiments of the invention.

Figure 3:
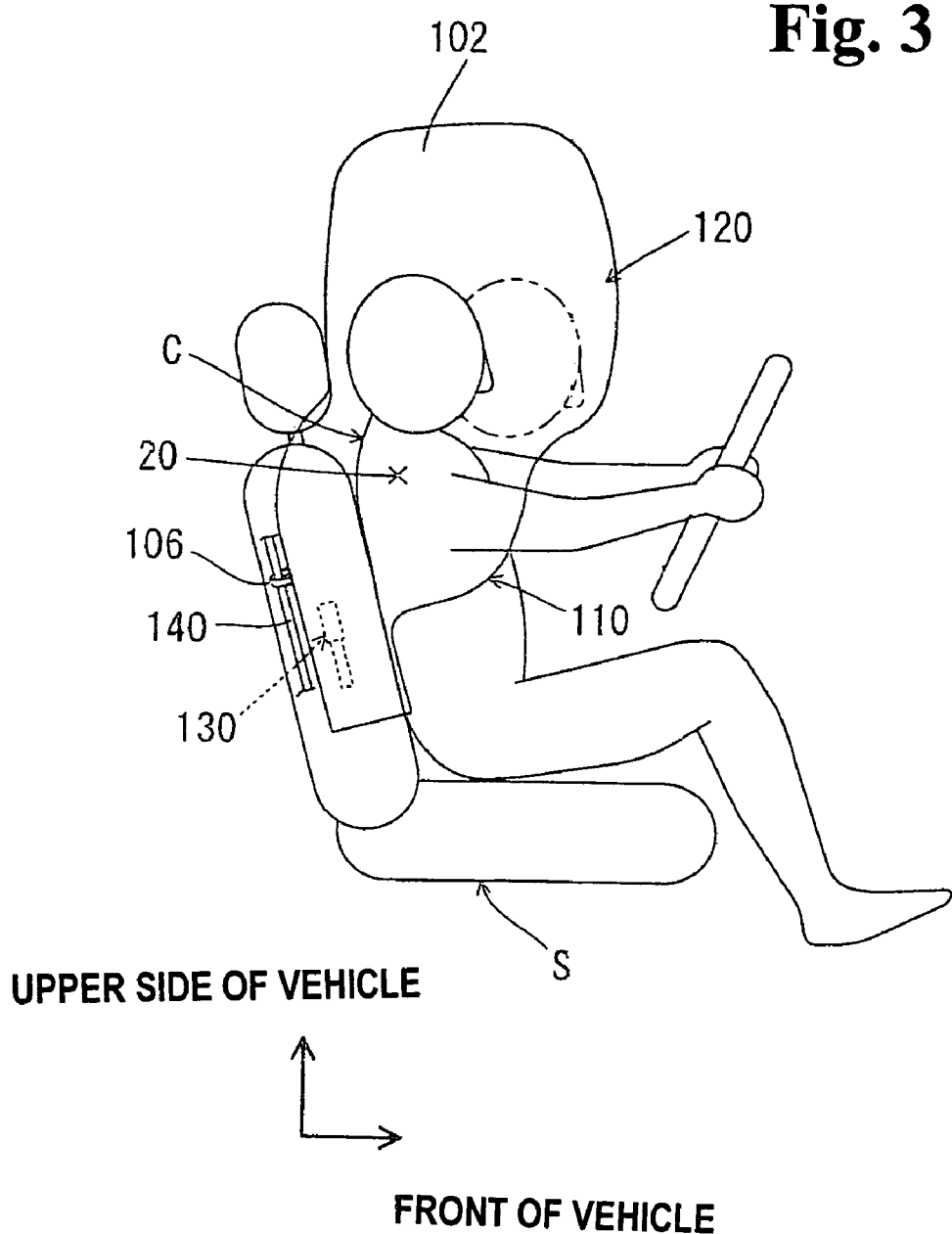
FIG. 3 is a side view of the airbag deployed and inflated for a vehicle passenger C seated on a driver's seat S.
Figure 4:
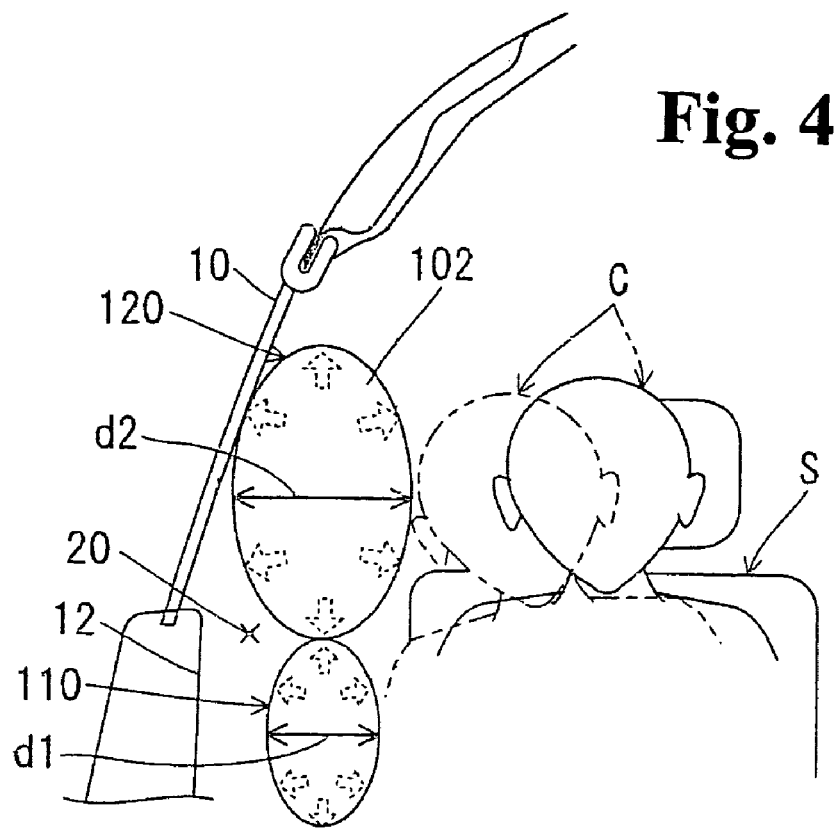
FIG. 4 is a front view of the airbag deployed and inflated for the vehicle passenger C seated on the driver's seat S.

A state in which the airbag 102 is deployed and inflated in case of vehicle accident, such as side collision or sideward rolling of the vehicle, is shown in FIG. 3 and FIG. 4. FIG. 3 is a side view of the airbag 102 deployed and inflated for a vehicle passenger C seated on the driver's seat S, and FIG. 4 is a front view of the airbag deployed and inflated for the vehicle passenger C seated on the driver's seat S.

When the side collision or sideward rolling (rollover) of the vehicle occurs, the gas supply device 130 is activated, and gas for deployment and inflation is generated from the inflator 131. The gas is distributed to the head chamber 120 and the chest chamber 110 by the distribution effect of the sleeve 132 and supplied in parallel to the head and chest chambers. In other words, the gas discharged from the gas discharge portion 131a of the inflator 131 is supplied to the head chamber 120 and the chest chamber 110 through separate routes. In association with this, the airbag 102 stored in the airbag apparatus 101 previously disposed in the driver's seat S starts its deployment and inflation action, and is deployed and inflated upward. At this time, the chest chamber 110 and the head chamber 120 of the airbag 102 are respectively deployed and inflated by gas flowing therein and the pressure which develops therein. At this time, when the passenger is constrained by the airbag 102, the airbag is inflated in such a manner that the chamber thickness d2 of the head chamber 120 in the lateral direction becomes larger than the chamber thickness d1 of the chest chamber 110 in the lateral direction.

The pressure in the chest chamber 110 is substantially uniformly increased in the entire chamber in a process of deployment and inflation. After the chest chamber 110 is completed the deployment and inflation, the chamber thickness of the chest chamber 110 in the lateral direction in FIG. 4 reaches the thickness d1, and then the gas pressure in the chest chamber 110 is lowered by the discharge of gas through a vent hole 112.

On the other hand, the head chamber 120 is deployed and inflated by the increase in pressure from the first compartment 121 disposed at the entrance of the head chamber, and thereafter, the second compartment 122 and the third compartment 123 which are then inflated in sequence. The first compartment 121 is inflated into a substantially cylindrical shape which extends longitudinally in the vertical direction, enabling it to support the second compartment 122 and the third compartment 123 from below. Therefore, an upright posture of the entire head chamber 120 in the vertical direction is ensured. Then, the chamber thickness of the head chamber 120 in the lateral direction in FIG. 4 with its deployment and inflation completed is a thickness d2 (>d1) at least when constraining the passenger. Then, since the period required for achieving a predetermined high pressure in the second compartment 122 is shorter than that of the third compartment 123, the build-up capability of the second compartment 122 which achieves substantial protective functions of the head portion of the vehicle passenger immediately after the occurrence of the accident is enhanced. Hence, the second compartment 122 can be deployed and inflated quickly.

In this manner, the airbag 102 is deployed and inflated in the passenger protection area 20 on the side of the vehicle passenger C so as to protect at least the head and chest portions of the vehicle passenger C as shown in FIG. 3 and FIG. 4. The passenger protection area/zone 20 is a protection area defined between the vehicle side wall portion composed of the side window 10, pillar, the door trim 12, or the like and the vehicle passenger C, and corresponds to the "passenger protection area" referred to in connection with the aspects of the present invention.

Then, the vehicle passenger C impacts with the airbag 102 (or vice versa) with its deployment and inflation completed, and is thus constrained by the airbag 102. At this time, after the vehicle passenger C has impacted with the airbag 102 with its deployment and inflation completed, the head chamber 120 is maintained in a high-pressure state, which is higher than the pressure in the chest chamber 110. Also, the period for which the head chamber 120 is maintained in a high pressure state is longer than period for which the chest chamber 110 remains pressurized. This is because of the gas discharging effect of the vent hole 112 in the chest chamber 110 and the gas sealing effect of the gas sealing agent and the coating layer in the head chamber 120. That is, the head chamber 120 is partitioned in a state in which the air tightness is enhanced by the gas sealing agent and the coating layer, and to the contrary, the chest chamber 110 has a vent hole 112 which is not provided in the head chamber 120. The gas sealing agent, the coating layer, and the vent hole 112 function to adjust the internal pressure in the chest chamber 110 and the head chamber 120, and constitute the "pressure adjusting means" used in the exemplary embodiments of the present invention.

In accordance with the embodiment of the present embodiment, since the quantity of gas flow flowing into the head chamber 120 is larger than that flowing into the chest chamber 110, at least upon completion of the deployment and inflation of the airbag, the pressure in the head chamber 120 is increased higher than the pressure in the chest chamber 110. The sleeve 132 of the gas supply device 130 of the present embodiment functions to increase the internal pressure in the head chamber 120 to a level which is higher than the internal pressure of the chest chamber 110, by distributing the gas at a uniform pressure supplied from the inflator 131 in parallel to the chest chamber 110 and the head chamber 120 while adjusting the quantity of gas which is delivered to each chamber. In this instance the sleeve 132 constitutes the "pressure adjusting arrangement/means" and the "gas distribution device/means" referred to in connection with the above-mentioned aspects of the present invention.

As described above, according to the present embodiment, the internal pressure in the head chamber 120 of the deployed and inflated airbag 102 is configured to be higher than the internal pressure in the chest chamber 110 in case of a vehicle accident, whereby the airbag 102 can be deployed and inflated in the optimal manner for constraining and protecting the head and chest portions of the vehicle passenger C. Accordingly, protection of at least the head and chest portions of the vehicle passenger is achieved.

According to the present embodiment, the sleeve 132 is employed for distributing the gas in such a manner the quantity of gas flow flowing into the head chamber side is larger than that flowing into the chest chamber side in order to make the internal pressure in the head chamber 120 higher than the internal pressure in the chest chamber 110. Therefore, a single inflator 131 may be used thus simplifying the structure of the device.

According to the present embodiment, by employing the gas sealing agent or the vent hole 112, in addition to the gas distribution function of the sleeve 132, adjustment of internal pressure of the chamber is further ensured. At this time, by increasing the air-tightness of the head chamber 120 of the airbag 102 by the use of the gas sealing agent and the coating layer, the high-pressure state of the head chamber 120 after deployment and inflation can be prolonged, whereby protection of, particularly, the head of the vehicle passenger is ensured. Also, the vent hole 112 can prevent the internal pressure in the chest chamber 110 from excessively increasing or its high-pressure state from being excessively prolonged, whereby protection of, particularly, the chest portion of the vehicle passenger is ensured.

In addition, in the present embodiment, by partitioning the head chambers 120 into a plurality of space areas or compartments having different pressure build-up characteristics, the second compartment 122 and the third compartment 123, the head chamber 120 can be deployed and inflated as needed, and hence protection of the head of the vehicle passenger can be further ensured.

The present invention is not limited to the above-described embodiment, and various applications or modifications may be made without departing form the scope of the appended claims. For example, the variants/modifications which are mentioned below, may be implemented.

In the above-described embodiment, gas of a uniform pressure is supplied from a single inflator 131 and is distributed to the chest chamber 110 and the head chamber 120 while adjusting the quantity of gas flow by the sleeve 132. However, the present invention may be configured in such a manner that the two different types of gas having different pressures supplied from an inflator arrangement having a plurality of gas generating structures, and which are distributed to the chest chamber 110 and the head chamber 120 respectively.

The above described embodiment uses a gas sealing agent and a coating layer for restricting the release of gas from the head chamber 120, which are applied to the inner wall surface of the airbag panel of the airbag 102. Further, a vent hole 112 for allowing the gas in the chest chamber 110 to be discharged out from the chamber is provided. However, in the present invention, the gas sealing agent, the coating layer and the vent hole 112 may be omitted as needed. In accordance with the present invention, regarding the application of the gas sealing agent in the head chamber 120, at least one of the gas sealing agents applied to the seam 103 between the airbag panels and the coating layer applied on the entire surface of the inner wall surface of the airbag panels may be omitted as needed.

Also, in the above-described embodiment, the airbag apparatus 101 built in the passenger seat has been described. However, the airbag apparatus of the present invention may comprise a structure which is built into another portion other than the passenger seat, for example, the trim of the vehicle body, a pillar, or a roof rail.

In the above described embodiment, the airbag apparatus 101 has been described in connection with a driver seated in a drivers seat. However, the invention is not limited to the drive and the invention may be applied to other passengers which are seated either in the front or rear of the vehicle.

The disclosure of Japanese Patent Application No. 2004-331954 filed on Nov. 16, 2004 is incorporated herein.

While the invention has been explained with reference to the specific embodiments of the invention, the explanation is illustrative, and the invention is limited only by the appended claims.

What is claimed is:

1. An airbag apparatus comprising:
    an airbag to be deployed and inflated in a passenger protection area between a vehicle passenger and a vehicle side wall portion in case of vehicle accident, said airbag having a head chamber for protecting a head of a vehicle passenger and a chest chamber for protecting a chest portion of the passenger;
    a gas supply device for simultaneously supplying gas for deployment and inflation to the head chamber and the chest chamber; and
    a pressure adjusting device which adjusts an internal pressure of the head chamber to a level higher than an internal pressure of the chest chamber at the time of deployment and inflation of the airbag,
    wherein said head chamber comprises first, second and third compartments to be inflated sequentially; said first compartment is arranged vertically and is located at a side of the chest chamber; said second compartment is located above the chest chamber and only directly communicates with the first compartment to receive the gas; said third compartment is separated from the second compartment so that the third compartment communicates with the second compartment at one side close to the first compartment and the other side away from the first compartment; and said gas supply device is arranged to first inflate the first compartment to support the second and third compartments, which are inflated with gas flowing from the first compartment, in a position for head protection.

2. An airbag apparatus according to claim 1, wherein said pressure adjusting device includes a gas distribution device for distributing and supplying gas with a uniform pressure supplied from a single gas supply device to the first compartment of the head chamber and the chest chamber while adjusting quantities of gas flow.

3. An airbag apparatus according to claim 2, wherein said gas distribution device includes a sleeve disposed around an outlet of the gas supply device to distribute the gas to the head chamber and the chest chamber.

4. An airbag apparatus according to claim 1, wherein the pressure adjusting device includes a vent hole formed in an airbag panel for allowing the gas in the chest chamber to be discharged from the chamber.

5. An airbag apparatus according claim 1, wherein the airbag has a gas sealing agent applied only to an inner wall surface of an airbag panel of the head chamber in order to restrict the gas in the head chamber from escaping from the chamber.

6. An airbag apparatus according to claim 1, wherein the gas supply device is located at a boundary between the first compartment and the chest chamber and supplies more gas into the head chamber than into the chest chamber.

7. An air bag apparatus according to claim 1, wherein said head chamber consists of said first, second and third compartments inflated sequentially.

8. An airbag apparatus according to claim 7, wherein said airbag is configured such that the head chamber is thicker than the chest chamber when the airbag is inflated.

9. An airbag apparatus according to claim 1, further comprising a strap formed at an outside of the airbag adapted to be attached to a supporting rod of a vehicle so that the airbag can slide over the supporting rod in inflation.

* * * * *